April 12, 1927.
A. ST. JOHN
X-RAY FILTER
Filed Oct. 20, 1921
1,624,443
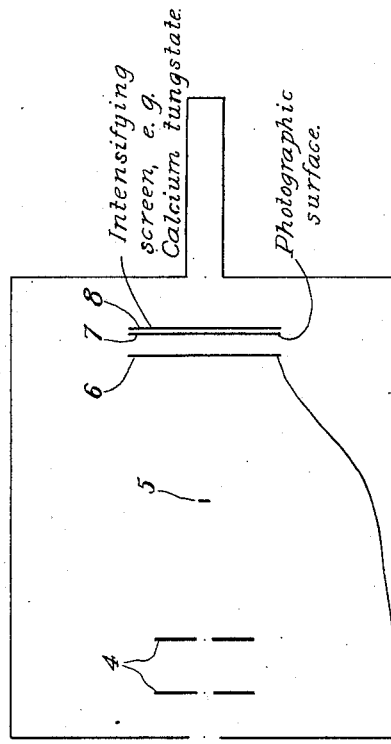
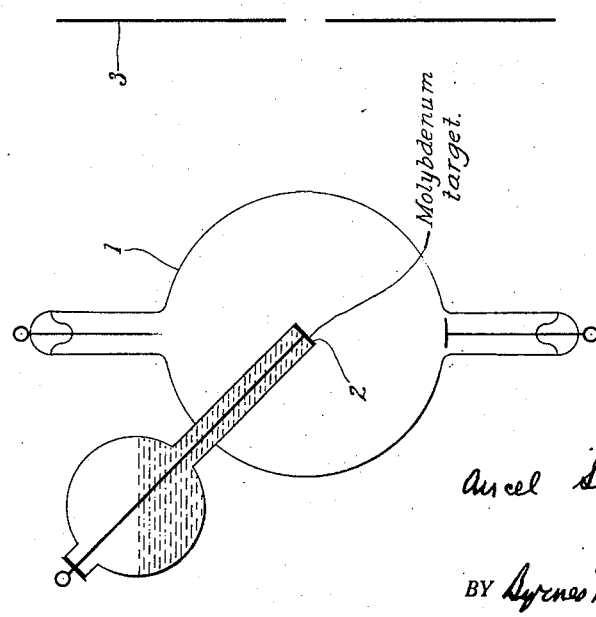
INVENTOR.
Ancel St John
BY
ATTORNEYS.

Patented Apr. 12, 1927.

1,624,443

UNITED STATES PATENT OFFICE.

ANCEL ST. JOHN, OF BROOKLYN, NEW YORK, ASSIGNOR TO UNION CARBIDE & CARBON RESEARCH LABORATORIES, INC., A CORPORATION OF NEW YORK.

X-RAY FILTER.

Application filed October 20, 1921. Serial No. 509,174.

This invention relates to filters adapted for use in connection with X-ray work, especially for the production of photographic images by X-rays.

Every substance, when properly excited, as by the action of cathode rays, emits a spectrum of X-rays of various wave-lengths, and the rays of one particular wave-length are considerably more intense than any other. In some classes of X-ray work it is desirable to suppress as far as possible all the wave-lengths of a particular X-radiation with the exception of a single portion of the spectrum, so that a radiation confined to a limited range of wave-lengths including that of maximum intensity, is obtained. Such a radiation is analogous to monochromatic light.

The elimination of all but the most intense radiation may be accomplished by the interposition of a suitable selectively absorbent or filtering material in the path of the rays. A material containing the same chemical element as that from which the X-rays are emitted will transmit the most intense radiation (usually called the K$\alpha$-line) fairly well, provided the material does not also contain an element which strongly absorbs the K$\alpha$-line. Such a material will also absorb much of the remainder of the spectrum, but it does not mean all the requirements of a filter because it transmits more of the radiation of second highest intensity (usually called the K$\beta$-line) than is desirable. A much better filtering action is obtained with a material in which the dominating element is one of slightly lower atomic weight than the element emitting the rays, since such a material absorbs the K$\beta$-line quite effectually, while transmitting the K$\alpha$-line fairly well. The wave-lengths of the X-ray spectrum as a whole increase with decreasing atomic weight of the emitting element, and the best filtering action is obtained when the filtering element is so chosen that the shortest wave-length of its spectrum is intermediate the wave-lengths of the K$\alpha$ and K$\beta$ lines of the radiation to be filtered. Thus, when the X-rays emanate from a molybdenum target, materials comprising molybdenum (atomic weight 96) make poor filters, materials containing columbium (atomic weight 93.5) are somewhat better, while materials containing zirconium (atomic weight 90.6) are best of all.

Regardless of which filtering material is used, the K$\alpha$-line is considerably weakened by absorption in the filter, and the time required to secure a photographic image of normal density is increased. It is known that the time of exposure in X-ray photography can be decreased if a fluorescent screen is arranged to intercept the rays, transform the energy contained in them into fluorescent light, and project the latter upon the photographic surface to add its effect to that of the X-rays.

Such materials as have been used heretofore for fluorescent screens for the above purpose are not adapted for filters and are best used behind the photographic film. The primary object of my invention is to provide means for absorbing undesired wave-lengths from an X-ray spectrum to prevent their action on a photographic surface, while utilizing actinically the energy of that portion of the desired wave-length which is incidentally absorbed with the undesired wave-lengths. I attain this object by using a material which fulfills the necessary requirements for a filter and which is fluorescent, placed in front of the photographic film, it being understood that fluorescent light will be emitted from the surface toward the film only at the places where X-rays are emerging from the filtering material, as any light produced by wave-lengths which only partially penetrate the filter will be cut off by the portion of the substantially light-opaque filtering material which lies beyond the plane where the penetration of the X-rays ceases.

The invention will be described and illustrated in the accompanying drawing in which the single figure is a diagrammatic representation of a device constructed in accordance with my invention, in connection with radiations from molybdenum, but it is to be understood that it is not limited to this particular source of rays. In the drawing I show an X-ray tube 1 having a target 2. A lead screen 3 is employed to protect the observer and a lead diaphragm 4 limits the pencil of rays impinging on the subject being observed. This subject, such, for example, as a crystal 5 is placed in the path of these rays. A sensitive surface 6 is located beyond the subject. When a molybdenum target is used, I prepare a filter 7 capable of becoming fluorescent under the action of X-rays and having the filtering action of a chemical element of an atomic weight close to but not above that of molybdenum. The element is preferably one of slightly lower atomic weight than molybdenum in order that the K$\beta$-line of the molybdenum radiation may be absorbed, and as already stated, a zirconium filter is preferable.

Fluorescent compounds of zirconium, such as zirconium fluoride rendered fluorescent by strong ignition, are applicable in general, but my preferred filtering material is the fluorescent variety of the double fluoride of zirconium and calcium. This salt may be made up into a filter in any suitable way, as by applying it with an adhesive to the surface of a card. When suitably placed between the source of the X-rays and the photographic surface, it operates to eliminate substantially all of the wave-lengths except those of maximum intensity. At the same time, the energy of the absorbed rays is partially converted into fluorescent light. This acts upon the plate and cooperates with the transmitted X-rays, thus reducing the time necessary to obtain a normal photographic image.

It is sometimes advantageous to use a screen 8, placed behind the photographic surface, in combination with the interposed filter just described. Such screen should comprise a fluorescent material highly absorptive for any X-radiation transmitted by the filter. In this way a maximum amount of the energy of the X-radiation may be utilized to affect the photographic surface. Any of the well known fluorescent screens may be placed behind the plate, such, for example, as those comprising calcium tungstate. It will be understood, however, that my invention is not limited to use with such absorptive screens. The filter will be placed between the material under examination and the photographic film and close to the latter, so that the fluorescent light emitted by the filter may exert the maximum actinic effect. The use of other filters of appropriate composition at any other point in the path of the X-radiation is not precluded.

When targets comprising elements other than molybdenum are used, the filtering and fluorescent material will of course be suitably selected to correspond with the element used. The basic idea of my invention is the adaptation of the fluorescent material to the particular radiation emanating from the target. Obviously, the invention will find its most favorable application wherever there exist elements of slightly lower atomic weight than the source of radiations which yield compounds capable of becoming fluorescent under the action of X-rays.

I claim:—

1. A filter for use with X-rays, comprising a fluorescent zirconium compound.

2. A filter for use with X-rays, comprising fluorescent calcium zirconium fluoride.

3. A filter for use with X-rays emanating from a target comprising molybdenum, and comprising a fluorescent compound containing an element having an atomic weight between 89 and 96.

4. In combination, a target adapted to emit X-rays, a photographic surface, and an interposed fluorescent filter comprising as its chief constituent an element of atomic weight just below that of the target.

5. In combination, a molybdenum target adapted to emit X-rays, a photographic surface, and an interposed fluorescent filter comprising as its chief constituent an element of atomic weight between 89 and 96.

6. In combination, a molybdenum target adapted to emit X-rays, a photographic surface, and an interposed fluorescent filter containing a zirconium compound.

7. In combination, a molybdenum target adapted to emit X-rays, a photographic surface, and an interposed fluorescent filter containing calcium-zirconium fluoride.

8. In combination, a source of X-rays comprising a molybdenum target, a photographic surface, a filter comprising a fluorescent zirconium compound interposed between said source and surface, and a fluorescent screen placed behind the photographic surface and capable of absorbing the major portion of the X-rays transmitted through said surface, both said filter and screen being so positioned that the light therefrom acts upon the photographic surface in cooperation with the X-rays transmitted through the filter.

In testimony whereof, I affix my signature.

ANCEL ST. JOHN.